United States Patent [19]
Lord

[11] 4,019,678
[45] Apr. 26, 1977

[54] MIXING VALVE

[75] Inventor: Thomas J. Lord, Dayton, Ohio

[73] Assignee: United Aircraft Products, Inc., Dayton, Ohio

[22] Filed: Dec. 4, 1975

[21] Appl. No.: 637,779

Related U.S. Application Data

[63] Continuation of Ser. No. 479,794, June 17, 1974, abandoned.

[52] U.S. Cl. .......................... 236/12 A; 236/80 B; 236/87; 251/45
[51] Int. Cl.² ...................................... G05D 23/13
[58] Field of Search ............ 236/12 A, 13, 102, 87, 236/80 B; 251/45, 46; 137/90

[56] References Cited

UNITED STATES PATENTS

| | | | |
|---|---|---|---|
| 2,550,907 | 5/1951 | Brown | 236/80 B X |
| 2,626,753 | 1/1953 | Merrill | 236/87 |
| 2,693,823 | 11/1954 | Sogge | 236/80 UX |
| 2,828,075 | 3/1958 | Panza et al. | 236/12 R |
| 2,833,304 | 5/1958 | Fish | 251/46 X |
| 2,933,257 | 4/1960 | Clark | 251/46 X |
| 3,561,482 | 2/1971 | Taplin | 236/12 A |

*Primary Examiner*—William E. Wayner
*Attorney, Agent, or Firm*—J. E. Beringer

[57] ABSTRACT

A mixing valve wherein a body provides plural inlets and a common outlet, with a valve settable to control flow from the inlet to a mixing chamber communicating with the outlet. A fluid pressure operated piston means adjusts the valve in its control positions. A temperature responsive device orients in the path of flow from the outlet and effectively controls the positioning of the piston means.

4 Claims, 1 Drawing Figure

U.S. Patent
April 26, 1977
4,019,678
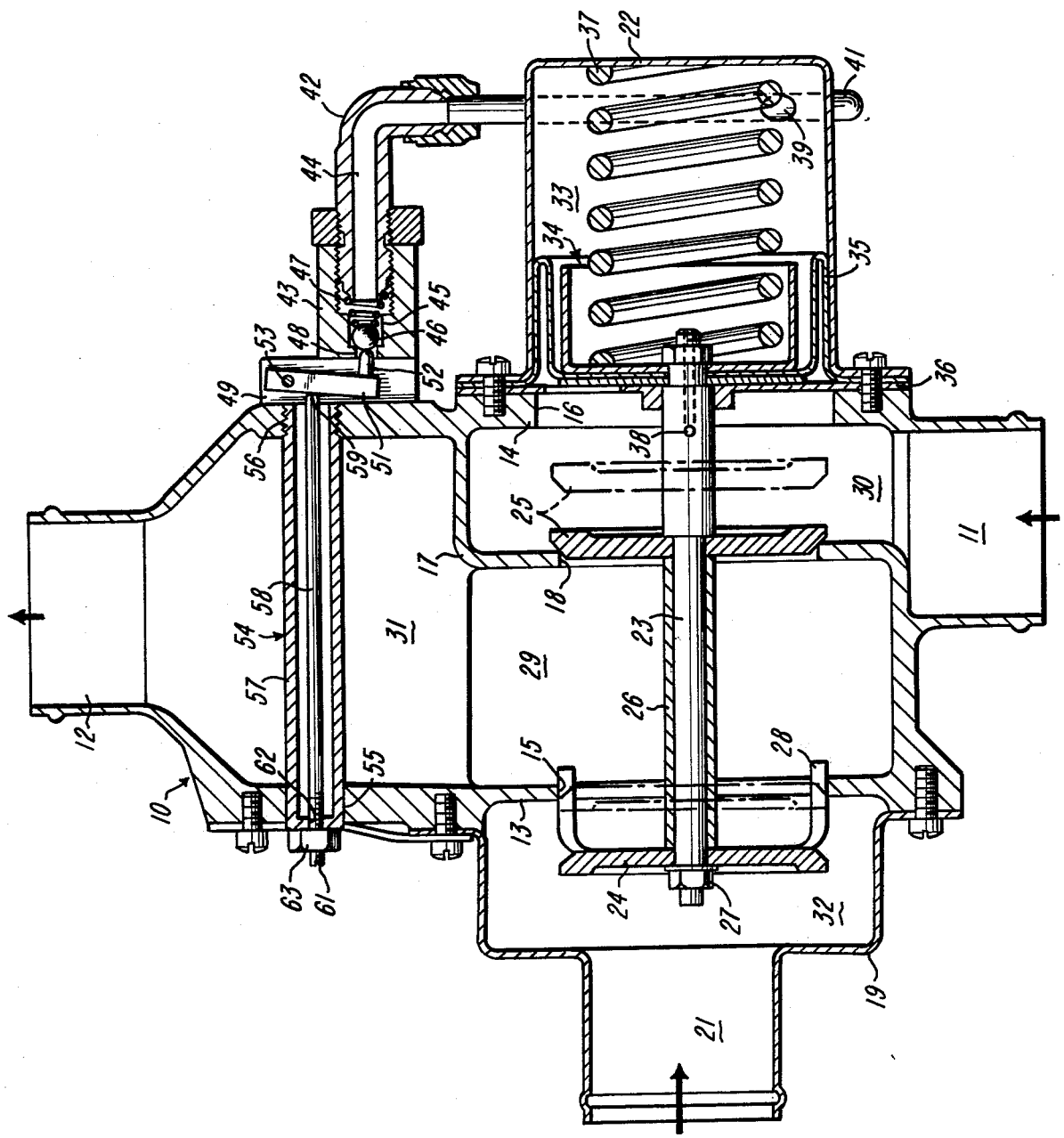

MIXING VALVE

This is a continuation of application Ser. No. 479,794, filed June 17, 1974, now adandoned.

BACKGROUND OF THE INVENTION

This invention relates to mixing valves, and particularly to hot air mixing valves as used for example for space heating purposes in aircraft. Valves of this class have a requirement for simplicity and reliability of construction and operation. They are, moreover, insufficiently known in installations where pressure fluids from different sources are brought to the valve and are required to be selectively used or to be mixed in varying amounts.

SUMMARY OF THE INVENTION

The instant invention has in view a unitary valve body formed with plural inlets and a single outlet. A valve shaft with valve plates thereon is adjustable in the body and selectively denies flow from the inlets to a mixing chamber or allows mixed flow to the chamber. The mixing chamber communicates with an outlet across which is stationed temperature sensing means capable of exercising a control function at selected temperature values. Servo-means in the form of a pressure fluid operated piston means operates under control of the temperature sensing means to adjust the valve shaft.

An object of the invention is to provide a new mixing valve characterized substantially as in the foregoing and in a simplified compact construction making it particularly adaptable for use in aircraft environments wherein one of the fluids is compressor bleed air.

Other objects and structural details of the invention will more clearly appear from the following description, when read in connection with the accompanying drawing, which is:

A view in vertical section of a mixing valve in accordance with the illustrated embodiment of the invention, components being in part in diagrammatic form.

Referring to the drawing, a mixing valve in accordance with the illustrated embodiment of the invention includes a body 10 constructed as a casting with generally opposing inlet and outlet openings 11 and 12. End walls 13 and 14 of the body are apertured to provide respective aligned openings 15 and 16. An intermediate interior body wall 17 provides an intermediately aligning opening 18. Fastened to the wall 13 is a fitting 19 which is in enclosing relation to opening 15 and provides a further inlet 21. Fastened to the wall 14 is a fitting 22 in enclosing relation to the body opening 16.

Within the valve body is a valve shaft 23 disposing concentrically of and aligning with body openings 15, 16 and 18. On the shaft 23 are valve plates 24 and 25 held in a longitudinally spaced relation thereon by means obvious from an examination of the drawing and including a spacer sleeve 26 and a retainer nut 27. Fixed to valve plate 24, to be a part thereof is a spider means 28 which has a sliding mount in opening 15 to provide bearing support for the shaft 23 at one end thereof without denying freedom of fluid flow through the opening 15. The valve plate 24 is adapted to seat to wall 13 in a surrounding relation to opening 15 to effect closure thereof. Valve plate 25 is adapted similarly to seat to wall 17 to effect closure of opening 18. As indicated, the spacing of valve plates 24 and 25 is such as to allow shaft 23 to be adjusted in an axial sense so that in one extreme position of the shaft opening 15 is open and opening 18 is closed and to another extreme position in which opening 15 is closed and opening 18 is open, with the shaft being settable to intermediate positions where some flow is possible through both openings.

For descriptive purposes, the body may be considered as providing a first inlet chamber 30 supplied with fluid from inlet 11, a mixing chamber 29 between openings 15 and 18 and an outlet chamber 31 through which fluid from mixing chamber 29 flows en route to outlet 12. Fitting 19 provides a second inlet chamber 32 supplied with fluid from inlet 21. The fitting 22 provides a pressure chamber 33 having a function in connection with the adjustment of shaft 23 which will hereinafter more clearly appear.

That end of shaft 23 which extends toward and into pressure chamber 33 has a piston means 34 attached thereto, which piston means includes a diaphragm 35. The letter is clamped at its margins between fitting 22 and body 10 by means which further hold in place to body 10 a bearing or guide plate 36. The latter is apertured for a free application of pressure to piston means 34 and provides a further bearing for the shaft 23. Diaphragm 35 seals that end of chamber 33 facing body opening 16 and is formed in folds and made flexible to allow the shaft to move relatively to the body and to fitting 22. A coil spring 37 is seated in fitting 22 and urges piston means 34 to the left or toward guide means 36, such motion being limited by engagement of valve plate 25 in opening 18. A small diameter passage 38 in shaft 23 interconnects chambers 30 and 33, to either side of piston means 34. A relatively large vent opening 39 appears in fitting 22 in communication with chamber 33. A tube 41 is suitably fastened, as by welding to the exterior of fitting 22 and extends by way of an adapter 42 to a housing 43 secured to the exterior of body 10 at the location of outlet chamber 31. Tube 41 and an extension passage 44 thereof in adapter 42 connects vent opening 39 to a chamber 45 in the housing 43. A valve 46 is in chamber 45 and is urged by a spring 47 to a seat closing an escape aperture 48. The latter communicates chamber 45 with an open, slotted portion 49 of the valve housing in free communication with ambient surroundings. In the slotted portion 49 is a lever 51 having a pin portion 52 adapted to enter opening 48 and unseat valve 46. The level 51 has a pivotal mounting in slotted portion 49 by virtue of a transverse fulcrum pin 53.

Arranged to operate the lever 51 is a sensor assembly 54 mounted in body openings 55 and 56 which dispose opposite of one another in line with slotted formation 49. Opening 56 is internally threaded and receives the correspondingly threaded end of a tube or sleeve 57 comprised in assembly 54. Tube 57 extends transversely through chamber 31 and has a sliding mount at its other end in opening 55. The described other end of the tube 57 is closed, the first mentioned end being open. Telescopically received in the tube 57 is a rod 58. One end 59 of the rod 58 is reduced in diameter and projects through the open end of tube 57 to engage lever 51. The opposite end 61 of the rod is externally threaded and extends through an internally threaded opening 62 in the closed end of tube 57. Threaded end 61 of the rod 58 projects through and beyond opening 62 and has a jam nut thereon to fix the rod in a set position of adjustment. The tip of end 61 is slotted to facilitate rotary adjustment of the rod. A retainer plate 64 is suitably mounted to body end wall 13 and functions in a manner which it is unnecessary here to consider to inhibit loosening of the jam nut 63.

The sensor assembly 54 has the character of a thermally sensitive power element and it will be noted in this connection to lie within and across outlet chamber 31 in the path of flow of fluid moving from mixing chamber 29 to outlet 12. The sensor assembly uses a bi-metal principle of operation, the tube 57 and rod 58 being made of materials selected to have different coefficients of expansion in response to temperature increase. In the illustrated instance, tube 57 is made of a Invar material and is relatively insensitive to temperature change. Rod 58, on the other hand, is made of an aluminum material and tends responsively to expand and contract under the influence of rising and falling temperature.

The mixing valve device is in its illustrated form particularly adapted for use in an installation supplying compressor bleed air in an unheated and a heated condition for use in space heating in aircraft. It will be understood, however, that it is generally applicable to systems where fluid under pressure is brought from two sources to be mixed as required for discharge through a common outlet. Thus, a first fluid at one temperature is brought to inlet 11 and a second fluid at a different temperature is brought to inlet 21. In accordance with the setting of valve shaft 23, the fluid supplied to inlet 11 or to inlet 21 is admitted to mixing chamber 29 and directed to outlet 12 exclusively of one another, or, the two flows are mixed in chamber 29 and directed to outlet 12 as a combined flow having an intermediate temperature. With the shaft 23 positioned as shown in the drawing, flow through the valve device is exclusively by way of inlet 21 through chambers 29 and 31 to outlet 12. In an alternate position, with the parts positioned as indicated in dotted lines, valve plate 24 closes opening 15 while valve plate 25 moves to an open position relative to opening 18. At this time, therefore, flow through the valve device is exclusively by way of inlet 11, chambers 30, 29 and 31 and outlet 12. With the shaft 23 in an intermediate position, that is, with both valve plates 24 and 25 removed from their seats on respective walls 13 and 17, some flow is permitted from both inlets 11 and 21 into mixing chamber 29. There, the two flows are combined and exit together by way of chamber 31 to outlet 12. Sensor assembly 54 senses the changing temperature value of the fluid flow passing through chamber 31, and, in conjunction with spring 47, makes appropriate adjustments in the position of ball valve 46. In this connection, it will be noted that irrespective of the position of valve plate 25, fluid pressure supplied to inlet 11 is admitted to chamber 30 and is at all times applied to what may be regarded as an outer face of the piston means 34. At the same time, the level of pressure in chamber 30 is communicated through small diameter passage 38 to pressure chamber 33 in back of the piston means. Exposed portions of the piston means being substantially the same on both sides thereof, the applied pressures in chambers 30 and 33 are substantially balanced. Spring 37 is under these circumstances effective to move the piston and valve assembly to the position illustrated where valve plate 25 seats on wall 17. Flow accordingly is permitted to take place from inlet 21 while being denied from inlet 11. Assuming the fluid at inlet 21 to be relatively hot, the sensor assembly 54 responds to increasing fluid temperature in chamber 31 by allowing contained rod 58 to grow in an axial sense with respect to tube 57 which is relatively unaffected by the increasing temperature. Rod 58 being anchored at one end in opening 62, its elongation in an axial sense is resolved into a projecting movement of end 59 which bears on level 51. The lever 51 accordingly is rocket about fulcrum 53 in a direction to cause pin 52 to unseat ball valve 46. Responsive to such unseating, pressure in chamber 33 is vented by way of vent opening 39 and communicating passages, the rate of flow out of vent opening 39 being substantially greater than replacement or makeup pressure can be supplied by way of passage 38. Accordingly, the pressures acting on piston means 34 become unbalanced with the greater pressure being applied in a direction to move the piston means inwardly of chamber 33 or in a direction to unseat valve plate 25 and to move valve plate 24 toward closed position. This motion may be allowed to continue until the described reverse seating takes place, whereupon further flow through the valve device is exclusively from inlet 11. The combination of pressures, in conjunction with continued partial restriction exerted by ball valve 46, may, however, result in the valve shaft 23 assuming an intermediate position where the valve plates 24 and 25 are in an intermediate position, both equally spaced from respective end walls 13 and 17 or with one more nearly approaching its respective end wall than the other. In any event, an intermediate position of the valve plates finds fluids from both inlets 11 and 12 admitted to chamber 29 where they may mix and flow jointly to the outlet 12. Assembly 54 continues to sense the fluid temperature and makes coresponding adjustments, as will be understood, in the position of lever 51. The latter makes corresponding changes in the position of ball valve 46 and is effective through the controlled pressure of chamber 33 variously to position piston means 34 and connected valve shaft 23. With the valve 46 fully closed pressure is allowed to build up in chamber 33 until pressures on opposite sides of piston means 34 are balanced whereupon spring 37 is allowed to move the valve assembly to what may be regarded as a starting or normal position as illustrated. Rising temperature of the fluid en route to outet 12 is effective through sensor assembly 54 to unseat valve 46 for a controlled venting of chamber 33. The valve shaft and valve plates 24 and 25 thereon move in correspondence with the reduced pressure in chamber 33 under the influence of applied pressure in chamber 30 and adjust the valve for an alternate or combined fluid flow. Ideally, it will be understood, the device functions to establish and to maintain a determined temperature value in the fluid discharging from outlet 12.

The invention has been disclosed with respect to particular embodiments. Structural modifications will of course be obvious to a person skilled in the art to which this invention relates and are considered to be within the intent and scope of the invention.

What is claimed is:

1. A mixing valve device, including:
   a. a body having spaced apart interior walls defining on opposite sides thereof inlet chambers and between them a mixing chamber opening into an outlet chamber,
   b. said body having an end wall cooperating with one of said interior walls in defining one of said inlet chambers, c. said interior walls and said end wall having aligned apertures,
d. a guide plate fixed to said body in a superposing relation to said end wall aperture,
e. a valve shaft axially adjustable in said body and valve plates on said shaft movable into and out of closing relation to respective apertures in said spaced apart interior walls responsive to axial adjustment of said shaft,
f. said valve shaft having spaced apart bearings in said body including a bearing for one end thereof in said guide plate, said one end of said valve shaft projecting through and beyond said guide plate,
g. means forming a piston chamber into which said one end of said valve shaft projects, said piston chamber having a closed end and an open end the latter communicating through said guide plate with said one inlet chamber,
h. piston means in said piston chamber attached to said one end of said valve shaft and defining at one end with the closed end of said piston chamber a pressure chamber and exposed at the other end to the fluid pressure existing in said one inlet chamber,
i. a restricted flow passage in said valve shaft having entrance and exit ends on respectively opposite sides of said piston means and delivering fluid from said one inlet chamber to said pressure chamber at a uniform rate,
j. means defining a relatively unrestricted vent passage from said pressure chamber,
k. spring means urging said piston means in a direction away from the closed end of said piston chamber,
l. means sensing a changing temperature of mixed fluids reaching said outlet chamber,
m. means utilizing temperature changes as sensed by said sensing means to control the escape of fluid from said pressure chamber by way of said vent passage to vary the pressure in said pressure chamber and thereby to induce changes in the axial position of adjustment of said valve shaft,
n. and said body providing inlets to said inlet chambers and an outlet from said outlet chamber.

2. A mixing valve device according to claim 1, characterized by
a. a fitting having a closed end and an open end,
b. said fitting being fixed at its open end to said body in superposing relation to said guide plate to define said piston chamber, the closed end of said fitting defining the closed end of said piston chamber.

3. A mixing valve device according to claim 2, wherein said piston means includes a piston overlaid at its said other end by a diaphragm, and means commonly fastening said fitting, the margins of said diaphragm and said guide plate to the said one end wall of said body.

4. A mixing valve device for use in an installation supplying compressor bleed air in an unheated and a heated condition for space heating and like purposes including:
a. a body providing plural fluid inlets for the heated and unheated air and an outlet and a mixing chamber in common communication with said inlets and said outlet,
b. valve means settable to positions denying flow from alternative inlets into said mixing chamber and to positions admitting a mixed flow to said mixing chamber,
c. said valve means including a valve shaft axially adjustable in said body and valve plates on said shaft movable into and out of closing relation to respective inlets responsive to axial adjustment of said shaft,
d. means forming a piston chamber, having an end in open communication with one of said fluid inlets and an opposite closed end,
e. said valve shaft at one end extending into said piston chamber,
f. a piston attached to said one end of said valve shaft and reciprocable therewith in said piston chamber,
g. said piston defining with the closed end of said piston chamber a pressure chamber,
h. spring means urging said piston in a direction away from the closed end of said piston chamber,
i. means defining a restricted passage for fluid entering said body by way of said one fluid inlet to flow to said pressure chamber,
j. said restricted passage being in said valve shaft and having entrance and exit ends on respectively opposite sides of said piston and being continuously open and delivering fluid from said one inlet to said pressure chamber at a uniform rate,
k. means defining a relatively unrestricted vent passage from said pressure chamber.
l. a vent control valve normally closing said vent passage,
m. lever means capable of being rocked in a direction opening said vent control valve,
n. a thermally sensitive power element lying within and extending across said outlet in the path of fluid flow moving from said mixing chamber to and through said outlet,
o. said power element including a tube and rod assembly, one of the elements of which has a coefficient of expansion greater than the other,
p. said lever means being arranged in the path of elongation of said one element to be rocked thereby in a direction to open said vent control valve,
q. a spring biasing said vent control valve normally closed and cooperating with said power element to make changes in the position of said vent control valve appropriate to a sensed temperature of the fluid exiting said mixing chamber,
r. said body having spaced apart walls defining inlet chambers communicating with respective fluid inlets and defining therebetween said mixing chamber,
s. said walls having aligned apertures through which said valve shaft extends to which said valve plates seat,
t. said body further having an end wall aperture aligning with the other said apertures, and through which said one end of said valve shaft extends,
u. said means forming a piston chamber being a fitting applied to said body end wall in surrounding relation to said end wall aperture,
v. and a guide plate fixed to said end wall by said fitting,
w. said valve shaft having spaced apart bearings in said guide plate and in one of said apertures in said spaced apart walls.

* * * * *